(No Model.)  D. H. CAMPBELL.  6 Sheets—Sheet 1.
BUTTON MACHINE.

No. 297,496.  Patented Apr. 22, 1884.

Fig. 1

Attest:
Philip F. Larner
Nowell Bartle

Inventor:
Duncan H. Campbell,
By Wm E Wood
Attorney.

(No Model.) 6 Sheets—Sheet 2.

D. H. CAMPBELL.
BUTTON MACHINE.

No. 297,496. Patented Apr. 22, 1884.

Attest:
Philip F. Larner
Howell Bartle

Inventor:
Duncan H. Campbell
By Wm C Wood
Attorney

N. PETERS, Photo-Lithographer, Washington, D. C.

(No Model.) 6 Sheets—Sheet 3.

D. H. CAMPBELL.
BUTTON MACHINE.

No. 297,496. Patented Apr. 22, 1884.

Attest:
Philip F. Larner
Nowell Battle

Inventor:
Duncan H. Campbell
By Wm C Wood
Attorney.

(No Model.)   6 Sheets—Sheet 4.

D. H. CAMPBELL.
BUTTON MACHINE.

No. 297,496.   Patented Apr. 22, 1884.

UNITED STATES PATENT OFFICE.

DUNCAN H. CAMPBELL, OF PAWTUCKET, RHODE ISLAND, ASSIGNOR TO HENRY B. METCALF, OF SAME PLACE, AND WILLIAM McCLEERY, OF BOSTON, MASSACHUSETTS.

BUTTON-MACHINE.

SPECIFICATION forming part of Letters Patent No. 297,496, dated April 22, 1884.

Application filed September 22, 1882. (No model.)

*To all whom it may concern:*

Be it known that I, DUNCAN H. CAMPBELL, of Pawtucket, in the county of Providence and State of Rhode Island, have invented certain new and useful Improvements in Button-Making Machines; and I do hereby declare that the following specification, taken in connection with the drawings furnished and forming a part of the same, is a clear, true, and complete description of the several features of my invention.

The class of machines to which my said improvements generally relate includes those in which a series of dies co-operate for uniting two or more parts to form a button, and my invention is illustrated and described in connection with a machine for making what I will term a "five-part" button, composed of a metal shell, a metal collet, a paper filling, and two cloth disks, respectively serving as front covering and a "tuft."

In a certain prior application for Letters Patent filed by me June 8, 1881, I have shown and described many novel features in automatic mechanism operating pneumatically for feeding the button parts to the die-table, and said features are to some extent, also, hereinafter generally referred to, and shown in my drawings, for the purpose of now illustrating and describing their connection with the several improvements devised by me and their mode of operation.

The objects of my present improvements are to render automatic feeding as certain and reliable as possible with a minimum of labor by the attendant, and also to provide for smoothly operating the machine at a greater speed than has, as I believe, heretofore been practicable with this class of machines.

After a full description thereof, the novel features, devices, and combinations of devices embodied in my improved machine will be designated in the several claims hereunto annexed.

Referring to the drawings, of which there are six sheets, Figure 1, Sheet 1, is a plan view of so much of my machine as is deemed necessary for illustration, and in which a portion of the upper part of the machine is removed for better disclosing certain portions of the feeding mechanism.

Figure 1:
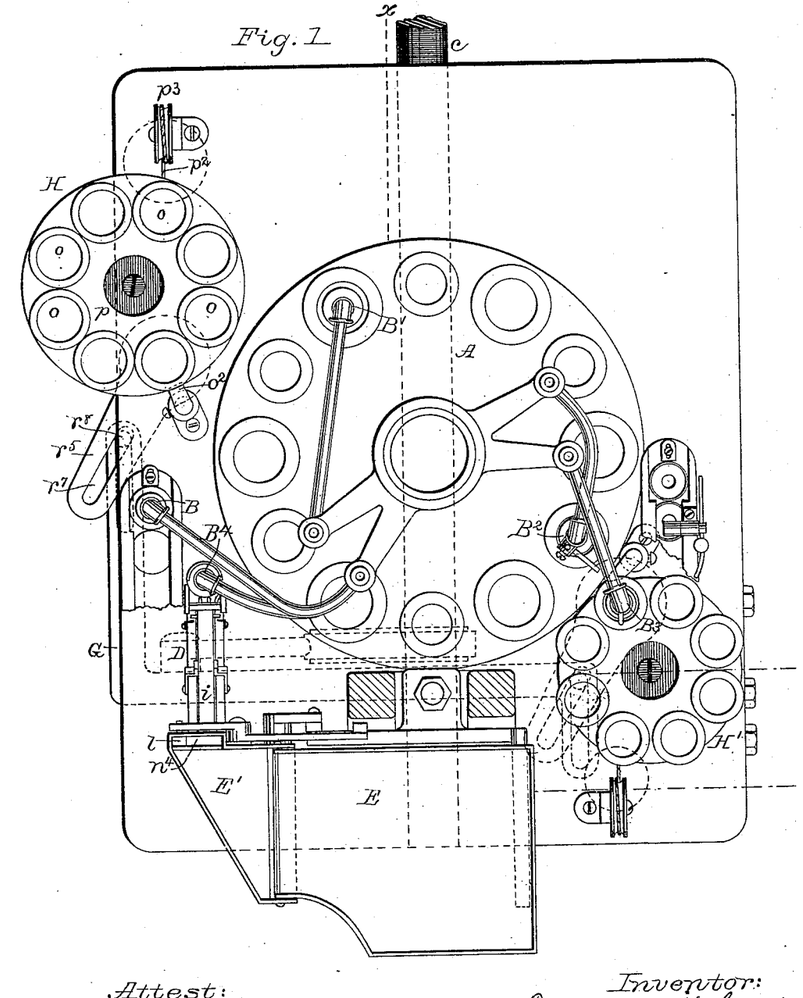
Figures 2, 4:
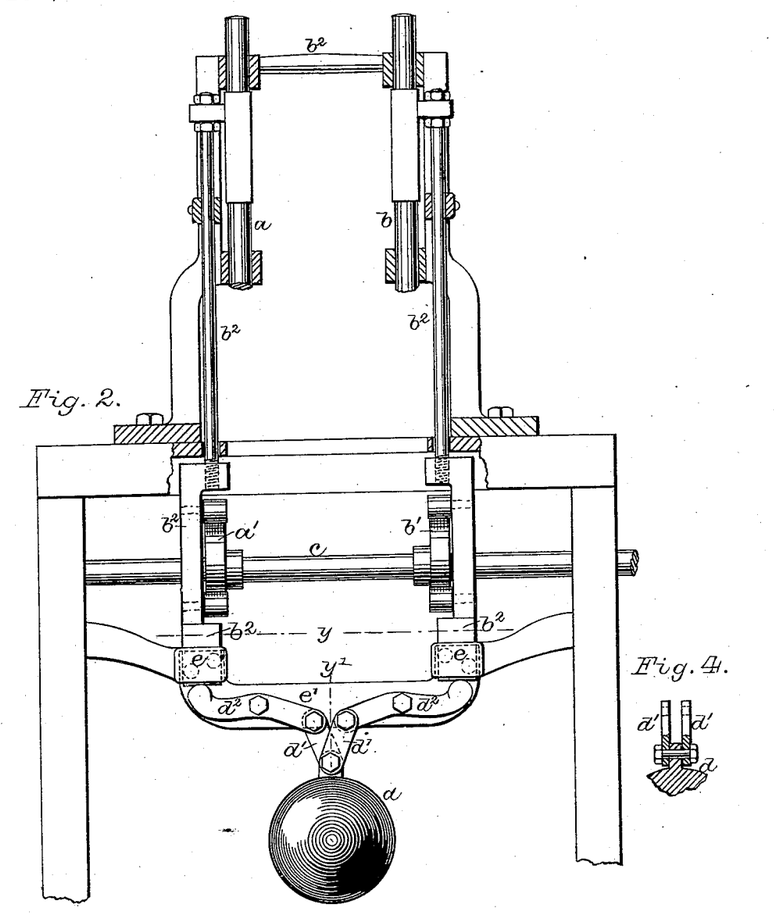
Fig. 2, Sheet 2, is a vertical longitudinal section of the machine on line $x$, Fig. 1, on a reduced scale, with such parts removed as enable the full disclosure of the main shaft, die-plungers, and balancing mechanism.
Fig. 4 is a vertical sectional view of a portion of Fig. 2 at line $y'$.
Figure 3:
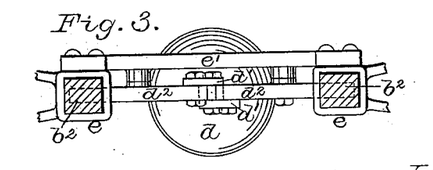
Fig. 3 is a horizontal sectional view of Fig. 2 at line $y$.

The die-table A, Fig. 1, has the usual number of sets of preliminary and finishing dies and the usual tuft and finishing plungers, and their spindles are shown in Fig. 2 at $a$ and $b$. Heretofore in this class of machines these two plungers have been connected by a frame, and operated simultaneously by means of the cams $a'$ and $b'$ on the main shaft $c$, said cams operating to lift and then to forcibly depress said plungers. So far as my knowledge extends, these plungers and the frame-work to which they are attached, and by which they are connected together and placed within the influence of said cams, have always been bodily supported by said cams, and therefore at the termination of each stroke more or less shock was involved, which rendered high speed impracticable. With my improvements in automatic feeding, I find that the speed of the machine can be largely increased; and to prevent the shock referred to, which is specially objectionable when feeding mechanism is employed, I have improved this portion of the machine by substantially relieving the cams from the weight of the plungers and their frame. This relieving effect can be provided for in various ways; but I employ a counterbalance-weight, $d$, and in doing this I provide, as heretofore, for the lower ends of the plunger-frame $b^2$ vertical guides $e$ on bracket-arms, which project from the main frame of the machine, and I connect these guides by a horizontal cross-bar, $e'$. The counter-balance $d$ is suspended by two links, $d'$, from the inner ends of two levers, $d^2$, which are fulcrumed upon the cross-bar $e'$, and have their outer ends rounded to afford suitable supporting-bearings for the two sides of the plunger-frame $b^2$, so that the latter, with the plungers, is practically supported by said weight.

I am of course aware that punching-machines and presses of various kinds embodying vertically-sliding plunger-frames have heretofore been provided with counterbalance-weights; but I know of no such prior use of such weights in machines embodying delicate feeding apparatus, which would be impaired in its operation by such shocks and jars as are practically obviated by said weight in my improved button-making machine. I employ cupules or suckers which are lifted, lowered, and vibrated, and operated pneumatically, substantially in accordance with my previous invention, and therefore I have not deemed it necessary to herein illustrate that portion of the mechanism which pertains to moving said cupules. It is to be understood, however, that the several cupules are connected by suitable pipes with a vacuum-chamber, which is located above and centrally between the plungers, and rises and descends with the plungers and cupules, and that below said cupules there is a star-wheel cam connected to and rotating with the die-table, by which the cupules are vibrated horizontally.

The several cupules or suckers, which deliver button parts from chutes or receptacles to the dies in my machine as now improved, are designated as follows:

The cupule B feeds metallic shells. B' feeds cloth disks for outside covers. $B^2$ feeds metallic collets. $B^3$ feeds cloth tuft-disks. $B^4$ feeds paper or pasteboard fillings, and still another cupule (not shown) removes the finished button, and said cupule is connected with the collet-cupule $B^2$, but with its arm branching off in the opposite direction, so that when the cupule $B^2$ is over a die the removing cupule is projected to the one side and beyond the die-table and over a receptacle, into which the finished buttons are deposited, as is fully shown in my aforesaid prior application for Letters Patent.

Figures 16, 17, 18, 19, 20:
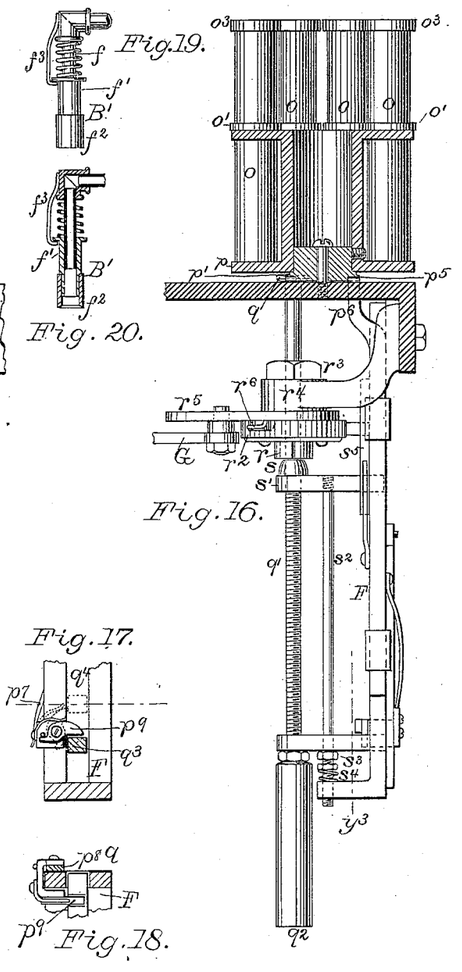
Fig. 16 is a partially-sectional side view of the mechanism shown in Fig. 15.
Figs. 17 and 18 are respectively vertical and horizontal sections on line $y^3$, Fig. 16, and $y^4$, Fig. 15.
Figs. 19 and 20, Sheet 5, are respectively side and vertical sectional views of a cloth-feeding "cupule" or sucker.

The cupules B, $B^2$, and $B^4$ are substantially as heretofore constructed by me, and are as described in my aforesaid application for Letters Patent; but I have now devised certain improvements which are embodied in the cupules B' and $B^3$, which work on cloth disks, and they are also equally desirable in the discharging-cupule. These improvements are illustrated in Figs. 19 and 20, Sheet 5, from which it will be seen that the vertical pipe or tube $f$ has telescoped upon its lower end the cupule B', which is composed of a flanged sleeve, $f'$, and a rubber mouth, $f^2$. An expansive spiral spring is interposed between the flange of the sleeve $f'$ and the elbow of the vertical pipe $f$, and the sleeve is secured against displacement by the stop $f^3$, which extends from the elbow downward beneath the flange of the sleeve. With this construction the cupule yields after contact with a cloth disk during the continued descent of the pipe $f$, and before the valves which control the sucking action of the cupule are opened, thus assuring greater certainty of action in engaging with a cloth disk.

I am aware that in machines for feeding sheets of paper to printing-presses cupules or suckers have been mounted upon the ends of tubes so backed up by springs as to enable them to yield vertically when a pile of paper is forced upward with its top sheet against the cupules, and so as to leave said sheet in their custody when the pile of paper is next lowered, and it is to be understood that I do not broadly claim a cupule or sucker mounted upon a yielding tube.

Figures 25, 26:
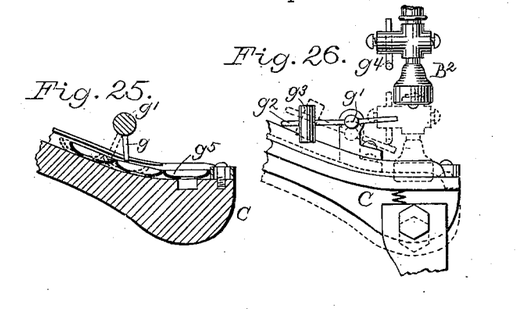
Figs. 25 and 26 are respectively sectional and side views of the lower end of a "collet-chute," with a collet cupule or sucker shown in the latter figure.

I have stated that the collet-cupule $B^2$ is as heretofore used by me; but I have devised certain improvements in connection with the chute employed therewith, which are illustrated in detail in Figs. 25 and 26, Sheet 6. The collet-chute C, at its lower end, is supported upon a yielding seat as heretofore constructed by me; but I have now combined therewith a retaining-finger, which, just prior to the time that the lowest collet in the chute is engaged by the cupule $B^2$, slightly forces backward the following collets, so that the one engaged by the cupule cannot possibly be disengaged by the contact therewith of the next collet, against which the line of collets in the chute is pressing. This retaining-finger is shown at $g$ depending from a rock-shaft, $g'$, which is above and across the chute and mounted in a suitable standard. Passing through the outer end of said rock-shaft, and at right angles thereto, is an arm, $g^2$, at the rear end of which is a weight, $g^3$, which, when in its normal position, holds the finger $g$ away from the collets, as shown in Figs. 25 and 26. The cupule $B^2$ is provided with a projecting arm or pin, $g^4$, so that when said cupule descends to engage with the lowest collet, $g^5$, in the chute said pin strikes upon the front end of the arm $g^2$, thus lifting the weight and causing the finger $g$ to swing rearwardly in contact with the underlying collet and to move the latter backwardly, as well as such others as may be in line above it, as is clearly indicated in dotted lines in Fig. 25. This employment of a retaining-finger I also find to be of value in connection with the cupule $B^4$, which feeds paper or pasteboard disks or "fillings," because the friction of the sometimes rough edges of the lowest disk in the chute with the next one (especially when pressed against by other disks in line within the chute) is liable to disengage the lowest disk from the cupule.

Figures 5, 8:
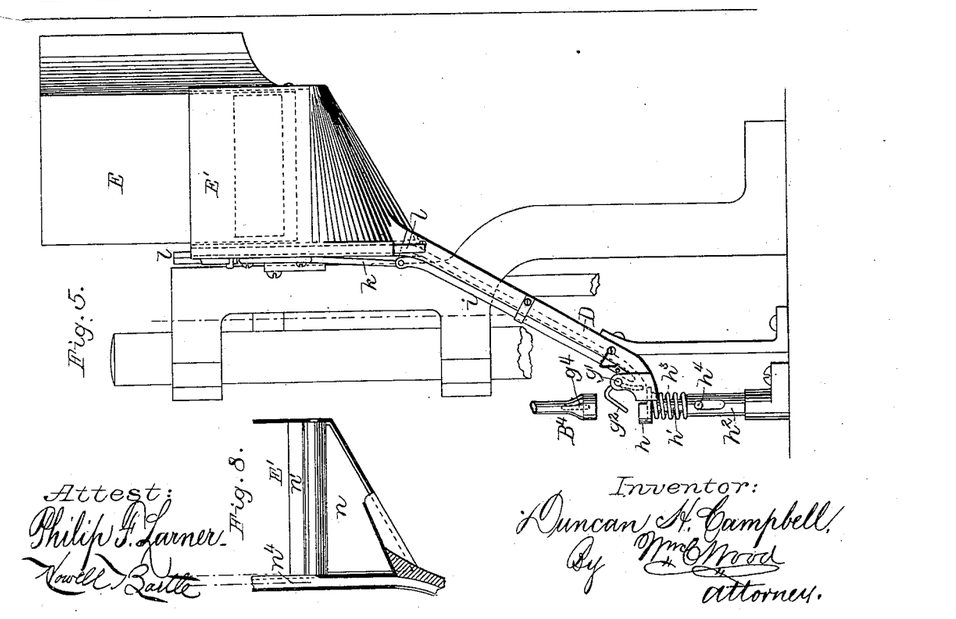
Fig. 5, Sheet 3, is a side elevation of a portion of the "paper-feed" mechanism, with such other adjacent portions of the machine as are deemed requisite for illustration.
Fig. 8 is a vertical section of the lower portion of the hopper on line $y^2$, Fig. 7.
Figures 6, 7, 9:
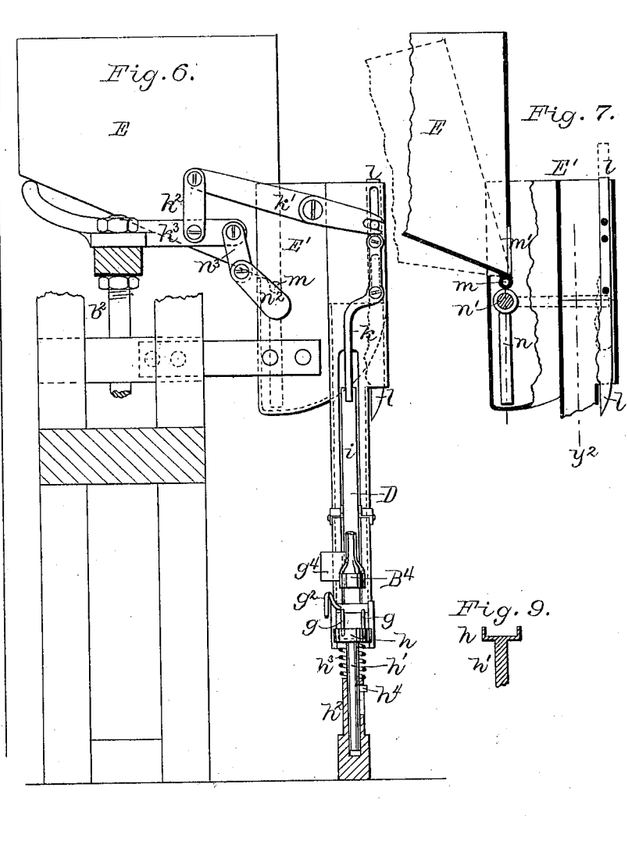
Fig. 6 is a front view of said paper-feed mechanism, Fig. 5.
Fig. 7 is a view of the paper-feed hopper at the upper right-hand portion of Fig. 6, with the levers and portions of the front plates or sides of said hopper removed.
Fig. 9 is a vertical central section of a yielding foot which receives the paper fillings at the base of the chute, shown also in side and front views at the lower portions of Figs. 5 and 6.

In Figs. 5 and 6, Sheet 3, and 10, 11, and 13, Sheet 4, I have illustrated said finger as employed with the filling-disk chute D, and in referring thereto I will use the same letters of reference wherever they may properly apply here. The retaining-finger $g$ is here duplicated or pronged, so that it can engage with the edge of a disk at both sides of its point of contact with the lowest disk in the chute. Said double finger depends from the rock-shaft $g'$, and the outer end of the rock-shaft has the arm $g^2$, which in this case needs no weight. The cupule $B^4$, Figs. 5 and 6, has a projecting arm, $g^4$, which, instead of being a pin, is a vertical piece of sheet metal standing edgewise, so that when the cupule descends into the lower end of the chute said arm strikes the arm $g^2$, which moves the finger $g$ rearwardly, thus forcing backwardly the disk next to the lowest disk and all others which stand in line within the chute, thus enabling the cupule to readily engage with and surely remove the lowest disk from the chute.

The chute D, the hopper, and the mechanism operating therein for delivering paper disks to the chute embody various improvements, which will next be described.

The chute D as now devised by me, and shown on Sheet 4, instead of having a foot which is integral with the main portion of the chute, as heretofore, has an independent yielding foot, $h$, having a segmental rim at its top for contact with a disk, and a stem, $h'$, which slides within the post $h^2$. In order that the foot may freely yield, the stem is surrounded by an expansive spiral spring $h^3$, which rests upon the post and supports the foot, the stem of which has a pin, $h^4$, occupying a vertical slot in the post, for maintaining the foot normally at a proper elevation with relation to the adjacent portion of the chute. When the cupule $B^4$ descends upon a disk resting on the foot, the latter yields to the downward pressure of the cupule until the valves open for connecting the interior of the cupule with the vacuum-chamber to which it is attached, and therefore at the initial upward movement of the cupule the upwardly-rising foot moves the disk upward, so that by the time said foot ceases to rise the cupule has a secure hold upon the disk. In my former machine the entire lower portion of the chute yielded; but the lowest disk was not entirely isolated from the succeeding disk, as now; and I obtain a greater yielding capacity by using the independent foot.

Figures 10, 11, 12, 13, 14:
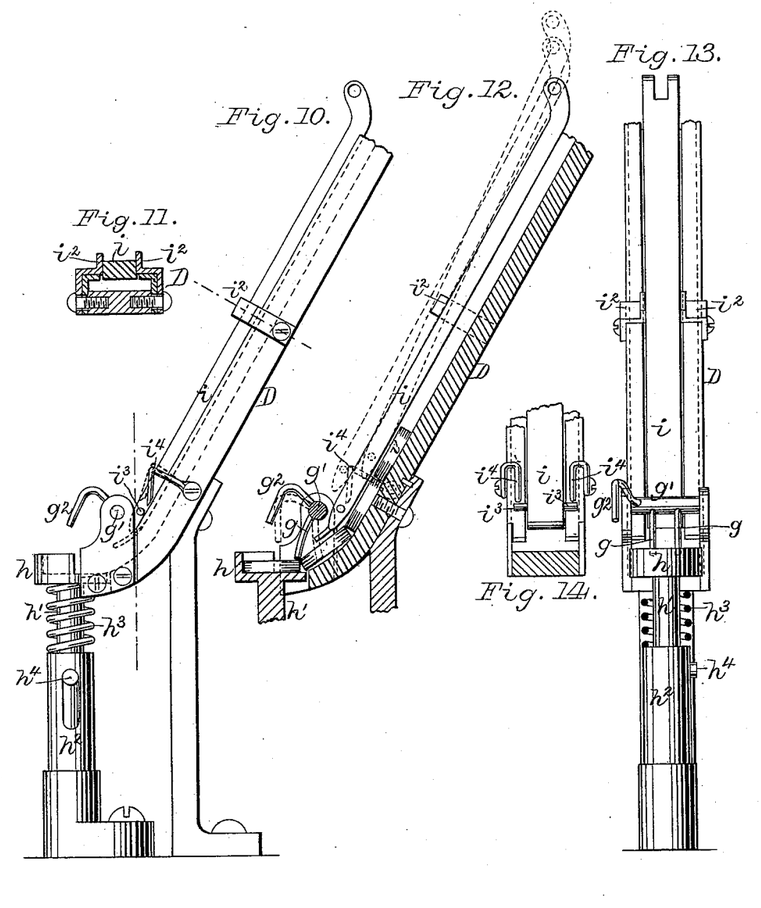
Figs. 10 to 14, inclusive, Sheet 4, are enlarged views of the filling-chute which is shown in Figs. 5 and 6.

In my former application I also showed and described a rigid chute having a rigid foot; but the latter had a circular aperture, occupied by a disk-plate which was backed up by a spring, so that when a button part was accurately located on said disk-plate it could yield under the pressure of the cupule. My present detached yielding foot differs from said prior rigid foot with the yielding disk-plate in this, that a button part can only be properly engaged by a cupule when said part is wholly on the plate; and if said part should overlie the adjacent portion of the unyielding foot at either side of the plate it would be tilted, and make it difficult for a cupule to firmly engage therewith, whereas with a detached yielding foot as now devised by me a button part cannot be tilted, and is always presented flatly to the cupule. The tendency of the paper disks or fillings to clog, not only by reason of their lightness, but because of frictional contact with each other and with other surfaces, as well as their variable thickness, renders it important, with a view to their reliable delivery to the cupules, that they be positively controlled while occupying the chute, and this I have provided for by furnishing the chute with a sliding top, $i$, which moves forward or downward while resting on the disks $i'$ and in frictional contact therewith. If the chute had a sliding bottom, or if the bottom of the chute should be an endless belt, it would serve a good purpose, and to a substantial degree take the place of the sliding top, and said belt could be operated continuously or intermittingly, in which latter case it would more closely resemble the sliding top $i$. This chute-top $i$ is located between the guides $i^2$, as clearly seen in Figs. 10 and 11, Sheet 4. At its upper end said top is connected by a link, $k$, to a vertical agitator, $l$, (hereinafter to be described,) and said agitator is vertically reciprocated by a lever, $k'$, which, by a link, $k^2$, is connected to an arm, $k^3$, mounted upon top of the plunger-frame $b^2$, so that when said frame rises and falls the chute-top $i$ is reciprocated longitudinally, its downward and upward movements respectively timing with the upward and downward movements of the plunger-frame. In order to obtain the best possible results, I have also provided for the lifting of the lower end of the sliding chute-top bodily during its backward and upward longitudinal movement, in order that it shall only be in contact with the disks during its downward or forcing movement; and I accomplish this by means of a lateral pin, $i^3$, in the chute-top $i$, and a pair of inclined latch-slides, $i^4$, operating after the manner of an automatic switch, and composed of spring wire so bent that when the chute-top moves downwardly its pin at each end passes beneath said slides, and when said chute-top moves upwardly said pin overrides the latch-slides, thus lifting the top free from contact with the disks. In Figs. 10, 11, and 12 the construction and arrangement of the chute-top pin and latch-slides are clearly shown, with dotted lines in Fig. 12 indicating the various positions of the chute-top.

In my former machine the hopper for the paper disks or fillings was provided with a revolving stirrer, and although that device performed good service, I have sought to render this portion of my machine still more reliable because of the tendency of the fillings to clog, which I have hereinbefore referred to.

Instead of using a hopper having but one compartment, as in my prior machine, I now employ a main hopper, E, and an auxiliary hopper, E'. These are clearly shown on Sheet 3. The main hopper E is rectangular in form, but has an inclined bottom, and is pivoted at its lower front edge, as at $m$, to the auxiliary hopper E', which is fixedly mounted upon the frame of the machine. At its front end the main hopper projects into the auxiliary hopper, and has at its bottom an aperture, $m'$, Fig. 7, opening into the auxiliary hopper. At its rear end said main hopper rests upon the arm $k^3$, which has before been described as mounted upon top of the plunger-frame $b^2$, which is vertically reciprocated, and consequently imparts to the main hopper an intermitting rocking motion, which results in a gradual discharge of fillings into the auxiliary hopper.

The auxiliary hopper E' is triangular in horizontal section, as seen in Fig. 1, and has a rounded and inclined bottom. (Clearly seen in Figs. 5 to 8, inclusive, Sheet 3.) Within this portion of the hopper is a nearly-triangular stirrer, $n$, which depends from a rock-shaft, $n'$, the end of which projects through the front wall of the hopper, and has thereon an arm, $n^2$, which is pivotally connected by a link, $n^3$, to the arm $k^3$ on the plunger-frame $b^2$, so that when the latter is vertically reciprocated the stirrer $n$ is caused to vibrate from a vertical to a nearly horizontal position within the auxiliary hopper, as clearly indicated in Fig. 7. The inclined curved bottom causes the fillings to mass adjacent to the mouth $n^4$ of the chute D.

It will be seen on referring to Figs. 1, 5, 6, 7, and 8 that the front end of the hopper E' is recessed, so as to form three sides of the vertical mouth $n^4$, and that said mouth opens laterally directly into the hopper, but forms no part thereof, because a disk filling, when within said vertical mouth, has been separated from the mass of fillings within the hopper and wholly removed from the influence of the stirrer, which sweeps with its front edge across the open side of the mouth in a vertical plane and causes the fillings to separately enter the mouth in a vertical position, and then they are free to fall edgewise into the vertical upper end of the chute.

I am of course aware of the common use of hoppers, chutes, and stirring devices within said hoppers; but, as I believe, in all prior combinations of this class the stirrer vibrates or sweeps horizontally across the mouth of a chute or tube at its junction with the bottom of the hopper; but it will be seen that my stirrer does not so sweep, because its lower or inclined edge does not cross or pass over the vertical portion of the chute, which opens into the hopper at its front lower end, and it will be readily seen that it is the vertical or front edge of the stirrer which causes the fillings to assume a vertical position edgewise, and to be delivered in that position so as to fall into the vertical mouth of the chute, which extends upward along the front end of the hopper and communicates directly with its interior in a vertical plane. This construction and arrangement of these parts is important, in view of the lightness of the paper fillings, which, with their lack of uniformity in thickness and their rough edges, renders it of practical consequence that they be delivered from the hopper so that they can fall edgewise into the chute.

I have found it to be desirable to provide the mouth $n^4$ with one movable side, which, by being vertically reciprocated, assures the proper downward movement of the light fillings regardless of their tendency to clog. I have therefore introduced the agitator $l$, so that it serves as one side of the mouth of the chute, but projecting at its lower end through an opening in the auxiliary hopper, so as to permit its free vertical reciprocation, as is clearly shown in Figs. 5 to 7, inclusive. This vertical agitator receives its movements from the plunger-frame $b^2$, acting through the lever $k'$, link $k^2$, and arm $k^3$, before described, in connection with the sliding top of chute D. The form of the lower portion of the auxiliary hopper is such that the fillings naturally congregate at the front end thereof, and therefore, while I prefer the swinging stirrer, substantially as shown, I do not limit myself thereto when the vertically-reciprocating agitator is employed, because the latter, in its operation, is conducive to the flatwise introduction of the fillings into the vertical mouth, so that they freely descend edgewise, and therefore other forms of stirrer may be employed therewith with approximately satisfactory results.

I will next describe my improvements in connection with the cloth-feeding portions of my machine, which co-operate with the cover and tuft cupules B' and B³.

In my former machine I employed a series of cylindrical receptacles for cloth disks, mounted upon a rotative table, and a follower which was forced upward by a weight, cord, and pulley for forcing the disks upward to the top of each cylindrical receptacle, so that said disks might be always accessible to the cupules which conveyed them to the dies. In order that the mass of cloth disks should not be forced by the follower upward and out of the cylindrical receptacles or tubes, the latter were of necessity inwardly contracted at the top, and therefore the uppermost disk was always more or less pinched at its periphery between said contracted top of the tube and the underlying disks, and as a result the cupule had to so pull each disk as to cause it to sometimes lose its grasp or hold thereon. I have now obviated this defect by causing the top of the pile of disks to be maintained at a constant level or height by means of positively-operated mechanism, which, at the removal of each disk, raises the pile so as to present the uppermost disk in the plane occupied by the one last removed from the tube.

Instead of depending upon the attendant to rotate the table upon which the disk-tubes are mounted, as in my prior machine, I have now devised mechanism whereby, when one tube is emptied, the table is automatically revolved for placing a full tube in proper position for the discharge and delivery of its contents. These portions of my present invention are illustrated in Fig. 1, Sheet 1, and in Figs. 15 to 24, inclusive, Sheets 5 and 6.

The feed-tubes $o$ for the cloth disks are mounted upon a rotative table, $p$, having a groove serving as a band-pulley, $p'$, to which a cord, $p^2$, is attached, and said cord passing over a grooved pulley, $p^3$, has at its lower end a weight, $p^4$, so that when said cord is coiled upon the band-pulley $p'$ the weight causes the table to rotate when permitted so to do, as hereinafter described. Each tube $o$ is successively presented above the follower $q$, which rises from below the table, and as the pile of cloth disks frequently engage with considerable friction against the interior surface of said tubes, I have provided against the lifting effect of the follower by securing the tubes to the table. This may be done by tapping the lower ends of the tubes into screw-threaded holes in the table, or by means of pin-catches, as in my prior machine; but they involve considerable care and labor in removing and replacing tubes, and I therefore provide each tube with a collar, $o'$, which serves a double purpose, in that said tubes rest by said collars upon the upper portion of the table, and they also afford a surface with which an overhanging stationary stop, $o^2$, engages only when the tube is in position for discharging, as is clearly shown in Figs. 1 and 15. The cloth-tubes $o$ have a slightly-contracted top; but instead of having said top integral with the tube, as heretofore, I now construct it separately as an annular cap, $o^3$, which can be readily removed for filling the tubes from the top. This contracted top is not relied upon, as heretofore, to resist the thrust by the follower against the pile of cloth disks; but it permits the top disk to be more surely detached from the next underlying disk should two disks chance to be at once lifted by the cupule from the pile, because of the slight peripheral contraction by the top disk in passing through the slightly-contracted opening. The lower end of each tube is also slightly contracted, either by the contraction of the tube itself or by the use of a cap. This contracted bottom retains the disks within the tube while placing it in position for service, and both caps perform that service after the tubes are filled, preparatory to placing them upon the table, it being desirable that an extra number of tubes be provided and filled at leisure, so as to be ready for application to the tables from time to time. The tube-table $p$ has also at its base a ratchet-wheel, $p^5$, with which a stop-pawl, $p^6$, engages, except immediately after any one tube has fully discharged its contents. This pawl $p^6$ may be variously actuated and variously arranged, it being only material that it should operate automatically and at certain fixed intervals.

Figure 15:
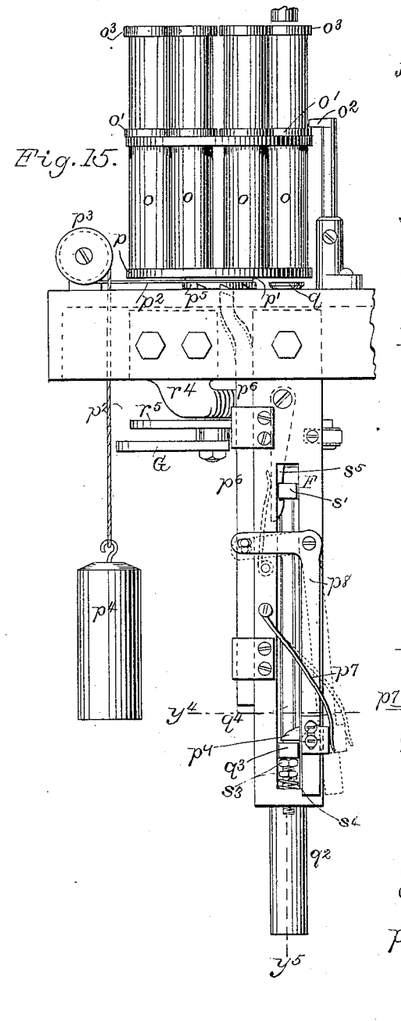
Fig. 15, Sheet 5, is a front view of a portion of the frame of the machine and a part of the "cloth-feed" mechanism.
Figure 21:
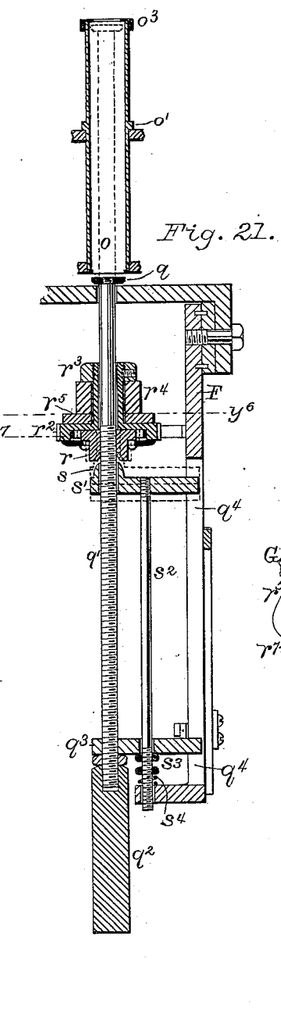
Fig. 21, Sheet 6, is a vertical section of Fig. 15 on line $y^5$.
Figure 22:
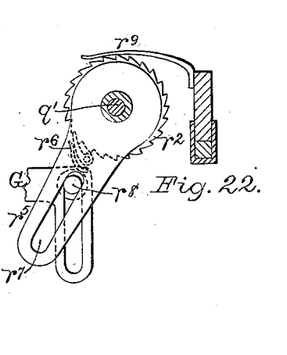
Fig. 22 is a horizontal section of Fig. 21 at line $y^6$.
Figure 23:
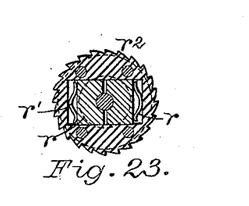
Fig. 23 is a horizontal section of Fig. 21 at line $y^7$.
Figure 24:
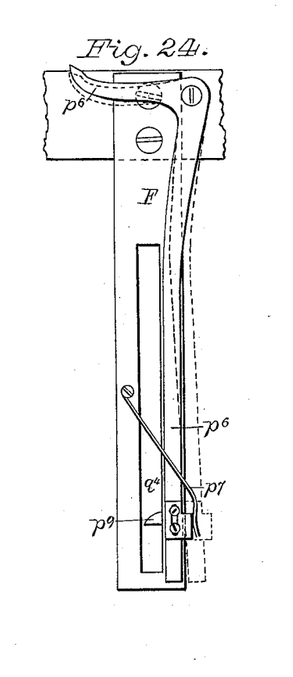
Fig. 24 is a front view of the lower portion of Fig. 15, with a modified arrangement of a bell-crank lever which operates as a spring-pawl in connection with cloth-disk-feed tubes.

Referring now to Sheets 5 and 6, it will be understood that the bed-plate of the machine is provided with a rigid pendent slotted plate, F, upon which the pawl $p^6$ is mounted. The disk-follower $q$ has a screw-threaded stem, $q'$, and a weight, $q^2$, is secured to its lower end. The threaded stem is tapped to a sectional or split nut, $r$, Fig. 23, provided with springs $r'$, and located within a rectangular chamber in a ratchet-wheel, $r^2$. This ratchet-wheel has a sleeve, Fig. 21, which loosely incloses the follower-stem, and has its upper end threaded for the reception of a nut, $r^3$. The ratchet-wheel is rotatively mounted by means of its sleeve and nut in a bracket, $r^4$, which projects laterally from an adjacent portion of the bed-plate of the machine, as seen in Figs. 15 and 16. The ratchet-wheel is intermittingly rotated by the lever $r^5$, (swiveled on the sleeve of the wheel,) and having a spring-pawl, $r^6$, and a laterally-reciprocating horizontal slide, G, beneath the bed-plate, operatively connected to the main shaft $c$ by means of an eccentric thereon, a strap, and an arm, as clearly indicated in dotted lines in Fig. 1. The ratchet-wheel pawl-lever is slotted, as at $r^7$, and the adjacent end of the slide G is also slotted, as seen in Fig. 22, and they are operatively connected by a pin or stud, $r^8$, which is adjustable to any position in the slot of the slide G, so that the pawl-lever may be moved much or little and correspondingly vary the extent of each rotative movement of the ratchet-wheel and nut, and thereby vary the speed at which the follower is lifted, according to whether the cloth disks in the tubes are thick or thin. The threaded stem $q'$ is prevented from being rotated by the nut by means of the arm $q^3$, which is rigidly secured to the stem near its lower end, and projects laterally into the guide-slot $q^4$ in the pendent plate F, as clearly shown in Figs. 15, 16, 17, and 21.

In order that the ratchet-wheel $r^2$ may be limited in its rotation to the precise movement of the pawl-lever, a spring-brake, $r^9$, is applied thereto, as clearly seen in Fig. 22. It is to be understood that the series H of feed-tubes for cloth covers and the series H' of feed-tubes for tufts are located on opposite sides of the machine, as seen in Fig. 1, and that the slide G extends laterally beneath the bed-plate, so that it intermittingly operates both followers with each revolution of the main shaft.

As thus far described, it will be readily seen that as the disks are removed from the tubes each follower will be positively lifted so as to place each topmost disk in the tubes then in use at a uniform height, and thus assure their proper delivery to their respective cupules.

I am aware that feed-tubes are shown and described in the English Letters Patent of Frearson, No. 13,853, (old law series,) which are provided with followers which are moved up and down prior to each removal of the topmost blank in the tube, said blank being prevented from falling when the others descend until such time as a pusher removes it laterally on its way to the dies; and it is to be understood that I do not claim a follower which is moved upwardly by a weight or a spring, or is reciprocated up and down, as in said English patent of Frearson, but limit myself to one which is positively lifted gradually, or step by step, at a speed which corresponds to that at which the fillings or blanks or disks are lifted, one by one, from the top of the pile supported in the tube by said follower.

In view of the fact that close attention would be involved in determining from time to time as to the quantity or number of disks remaining in a tube which was nearly emptied, and that considerable labor would be requisite for readjusting the follower by hand for working with a full tube, I have rendered this portion of my machine wholly automatic; and in order to reduce to a minimum the liability of a failure to deliver disks to the cupule, I prefer that the followers, when they arrive at such a height as will assure the presence of but few remaining disks, shall fall preparatory to the automatic partial rotation of the tube-tables and the presentation of a full tube in line with the follower. The dropping of the follower is effected by means of a conical wedge, $s$, which is automatically forced into a conical seat in the center of the split nut $r$, the latter being provided with a downward central projection or neck, as seen in Fig. 21. The wedge $s$ loosely embraces the stem $q'$ of the follower, and is mounted upon one end of a horizontal bar, $s'$, which at the other end occupies the guide-slot $q^4$ in the pendent plate F, and it is supported by a rod, $s^2$, which slides in a hole in the horizontal lower end of the plate F, and is provided with a pair of nuts, $s^3$, and an expansive spiral spring, $s^4$. Referring now to Fig. 21, it will be supposed that the follower has reached its highest point, as indicated in dotted lines, in which case the arm $q^3$, which is rigidly attached to the follower-stem, would be correspondingly elevated also, as shown in dotted lines, and it would therefore lift the conical wedge $s$ and its bar. The wedge being lifted separates the split nut $r$ and disengages it from the follower-stem, permitting the latter to freely fall, it being aided therein by the follower-weight. During said fall said wedge-block is maintained in proper spreading contact with said split nut by the spring $s^4$, which continues to force the rod $s^2$ and the wedge upwardly until the fall of the follower is completed, whereupon the power of said spring is overcome by the follower stem and weight, because of the bearing-contact of the rigid arm $q^3$ upon the upper nut, $s^3$, on rod $s^2$, leaving the several parts ready for action with a full tube, and precisely as shown in said Fig. 21. It is to be understood that the spring $s^4$ may have sufficient capacity to fully lift the conical wedge and the arm on which it is mounted, provided it be not strong enough to overcome the springs which control the split nut $r$, but nevertheless be strong enough to maintain the wedge in the position into which it is forced by the rigid bar on the follower-stem. The lower nut on rod $s^2$ serves to adjust the force of the spring $s^4$ when required. If, however, the spring $s^4$ be permitted to always maintain the wedge in close frictional contact with the conical socket in the split nut, the surfaces thus in contact would be liable to be unduly worn, and I have therefore introduced a pendent swinging spring-latch, $s^5$, as seen in Figs. 15 and 16. This latch is pivoted to the inner surface of the plate F, and hangs down opposite the slot therein, and it has an inclined face at its lower end, and at one edge thereof a rectangular recess for the reception of the arm $s'$, on which the conical wedge is mounted, whereby the wedge is kept from contact with the nut $r$, except when required for service. When the rigid arm $q^3$ rises into contact with the inclined face of the latch $s^5$, it releases the wedge-arm, and when the follower falls the wedge-arm is depressed and again placed in the custody of the latch.

I have already referred to the weight and pulley by which the tube-table is revolved when not held by the pawl $p^6$, which I will next describe. It is immaterial how this pawl is constructed, arranged, or operated, provided that when the follower falls the pawl should permit the tube-table to partially rotate for presenting a full tube to the follower. In Figs. 15 and 16 the pawl is shown in the form of a vertically-sliding bar, and in Fig. 24 it is a bell-crank lever; but in both cases it is maintained in engaging contact with the ratchet-wheel $p^5$ by means of a spring, $p^7$, which in one case is directly applied to the pawl, as in Fig. 24, and in the other it is applied to an intermediate bell-crank lever, $p^8$, which in turn is pivoted to the sliding pawl $p^6$, as seen in Figs. 15 and 16. At the lower end of the intermediate bell-crank lever, $p^8$, or the pawl-lever $p^6$, Fig. 24, as the case may be, there is a latch-finger, $p^9$, provided with an inclined upper face and a spring, so that its end may lift freely without causing the pawl to move, as seen in Figs. 15 to 18, inclusive. This latch-finger lies across the slot in the plate F, so that when the follower falls the rigid arm $q^3$ strikes the inclined face of said finger $p^9$, the latter is forced outwardly from beneath the arm, and being connected to the pawl-lever, as described, the latter is promptly vibrated, releasing the ratchet-wheel of the tube-table, which is then free to rotate to the extent of one tooth only, because when the arm $q^3$ passes below the latch the pawl is returned promptly to its normal position by the spring $p^7$.

It is obvious that the feed-tubes, their table, the follower, and its accompanying mechanism are equally serviceable, regardless of the character of the devices by which the contents of the tubes are transferred to the dies of the machine, and also that the follower, as described, may be profitably employed with a single tube instead of the series of tubes arranged for successive automatic presentation to the follower.

In view of the special descriptions as to the operation of the several portions of my machine which I have given in connection with the detailed description of the construction and arrangement thereof, it is believed that no further description of the operation of the machine will be necessary.

Having thus described my invention, I claim as new and desire to secure by Letters Patent—

1. In a button-machine, the combination, substantially as hereinbefore described, of the revolving die-table, its series of dies, automatic feeding mechanism, and the counterbalanced vertically-reciprocating plunger-frame, whereby shocks or jars liable to impair the operation of the feeding mechanism are obviated, as set forth.

2. The combination, in a button-machine, of the revolving die-table, the main shaft, its cams below said table, the plunger-frame, and the counterbalance-weight below said table, and its levers for lifting equally at opposite sides of said plunger-frame, substantially as described.

3. The combination, in a button-machine, of the vertical pipe, the mechanism for vertically reciprocating said pipe, the flanged sleeve and cupule telescoped on said pipe, and the spring on said pipe, which permits the cupule to yield to pressure during the descent of said vertical pipes and when the cupule is in contact with the button part which is to be lifted thereby, substantially as described.

4. The combination, in a button-machine, of a chute and a cupule, and a retaining-finger vibrated by the cupule as it descends into the lower end of the chute, substantially as described, whereby the lowest button part in said chute is relieved from contact with the next following part in the chute during the engagement of the cupule with said lowest part, as set forth.

5. In a button-machine, the combination, with transferring mechanism, of a feeding-chute provided with a separate or detached yielding foot, substantially as described.

6. A feeding-chute provided with a longitudinally-sliding top, which frictionally engages with the contents of the chute for forcing them to the foot of the chute for delivery therefrom, substantially as described.

7. The combination, with a feeding-chute, of a longitudinally-reciprocating sliding top and a latch-slide for lifting the lower end of said top away from the contents of the chute during its backward movement, substantially as described.

8. The combination of the stationary auxiliary hopper and the reciprocating pivoted main hopper, substantially as described.

9. The combination of a chute, a hopper vertically recessed at one end to form a three-sided vertical mouth for said chute, and a stirrer within the hopper, which sweeps in a vertical plane across the open side of said vertical mouth, substantially as described, whereby disk-shaped fillings massed in the hopper are separately caused to enter said mouth in a vertical position and left free to fall edgewise into the chute, as set forth.

10. The combination of a hopper, a chute having a vertical mouth at one end of the hopper, a vertically-reciprocating agitator, which serves as a movable side of said mouth within the hopper, and a stirrer which operates within the hopper, substantially as described.

11. The combination of a chute, a swinging triangular stirrer, and a hopper containing the stirrer, and having a rounded and inclined bottom, substantially as described.

12. In a button-making machine, the combination, with a series of vertical detachable tubes having each a collar, and mounted upon a revolving table, of a stationary stop, which engages successively with the collar of each tube as the table revolves, and thereby secures each tube against vertical displacement while delivering its contents, substantially as described.

13. A cloth-feed tube for button-machines, contracted internally at both ends and having one of said ends readily removable, substantially as described.

14. The combination, substantially as hereinbefore described, of dies, a feed-tube, a device for transferring the contents of said tube piece by piece to the dies, a follower, and positively-operated mechanism, substantially as described, for lifting said follower within said tube at a speed proportioned to that at which the contents of the tube are removed.

15. The combination, in a button-machine, of a feed-tube, a follower provided with a screw-threaded stem, a rotative nut which embraces said stem, a ratchet-wheel connected to said nut, and a pawl-lever which engages with said ratchet-wheel, and is vibrated by mechanism connected with the main shaft of the machine, substantially as described, for positively lifting said follower within the feed-tube, as set forth.

16. The combination of the follower having a threaded stem, a rotative split nut, which embraces said stem and lifts the follower, a ratchet-wheel and vibrating pawl-lever for rotating said nut, a rigid arm projecting from the stem of the follower below the nut, and a wedge, which is forced into service by the rigid arm as it rises with the follower-stem for opening the split nut and permitting the follower to fall, substantially as described.

17. The combination, with the follower, its threaded stem, the split nut, and the ratchet-wheel and vibrating pawl-lever for rotating the nut, of a rigid arm on the stem of the follower and a wedge forced upward by a spring, substantially as described, for maintaining the split nut in its opened condition during the fall of the follower, substantially as described.

18. The combination, with the follower, its threaded stem, the split nut, and the ratchet-wheel and vibrating pawl-lever for rotating the nut, of the wedge, its spring, and a rigid arm on the follower-stem, which, when the follower rises, causes said wedge to open the nut and permit the follower to fall, and when said follower falls causes said wedge to retire from the nut and permits it to close again upon the stem, substantially as described.

19. The combination, with the split nut, the follower, its stem, and rigid arm, of the wedge, its spring, and the pendent latch, by which the wedge is kept free from the nut until released by said rigid arm upon the follower-stem, substantially as described.

20. The combination, with a series of feed-tubes, a tube-table provided with a weight, cord and pulley, and a ratchet-wheel, of a follower which is common to all of said tubes, and a spring-pawl which engages with the ratchet-wheel and is automatically released therefrom at intervals by the follower, substantially as described, whereby when one tube is discharged the table is rotated sufficiently to present another tube to the follower, as set forth.

DUNCAN H. CAMPBELL.

Witnesses:
ARTHUR H. METCALF,
DANIEL MCNIVEN.